(12) United States Patent  
Klingbeil et al.

(10) Patent No.: US 9,109,545 B2  
(45) Date of Patent: Aug. 18, 2015

(54) SYSTEMS AND METHODS FOR CONTROLLING EXHAUST GAS RECIRCULATION COMPOSITION

(75) Inventors: Adam Klingbeil, Niskayuna, NY (US); Omowoleola Chukuwuemeka Akinyemi, Niskayuna, NY (US); Wontae Hwang, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 1042 days.

(21) Appl. No.: 13/194,337

(22) Filed: Jul. 29, 2011

(65) Prior Publication Data

US 2013/0030672 A1 Jan. 31, 2013

(51) Int. Cl.
| | |
|---|---|
| *G06F 7/00* | (2006.01) |
| *G06F 17/00* | (2006.01) |
| *F02B 47/08* | (2006.01) |
| *F02M 25/07* | (2006.01) |
| *F02D 41/00* | (2006.01) |
| *F02B 29/04* | (2006.01) |

(52) U.S. Cl.  
CPC ......... *F02M 25/071* (2013.01); *F02D 41/0007* (2013.01); *F02D 41/0052* (2013.01); *F02D 41/0085* (2013.01); *F02M 25/073* (2013.01); *F02M 25/0731* (2013.01); *F02M 25/0738* (2013.01); *F02M 25/0749* (2013.01); *F01P 2060/16* (2013.01); *F02B 29/0406* (2013.01); *F02M 25/0702* (2013.01); *Y02T 10/144* (2013.01); *Y02T 10/47* (2013.01)

(58) Field of Classification Search  
CPC .............. F02D 2250/11; F02D 41/008; F02D 41/0085; F02D 41/0007; F02D 41/0052; F02M 25/071; F02M 25/073; F02M 25/0731; F02M 25/0738; F02M 25/0749  
USPC ............ 123/568.11, 564, 559.1, 568.12, 704; 60/605.2; 701/109, 101–104, 108  
See application file for complete search history.

(56) References Cited

U.S. PATENT DOCUMENTS

| | | | | |
|---|---|---|---|---|
| 4,131,095 | A * | 12/1978 | Ouchi | 123/58.8 |
| 5,517,976 | A * | 5/1996 | Bachle et al. | 123/568.11 |
| 6,138,650 | A | 10/2000 | Bailey | |
| 6,158,416 | A * | 12/2000 | Chen et al. | 123/380 |
| 6,283,096 | B1 * | 9/2001 | Kimura | 123/501 |
| 6,286,489 | B1 | 9/2001 | Bailey | |
| 6,789,531 | B1 * | 9/2004 | Remmels | 123/568.11 |
| 7,278,396 | B2 | 10/2007 | Leone et al. | |
| 7,721,541 | B2 * | 5/2010 | Roberts et al. | 60/605.2 |
| 7,945,376 | B2 * | 5/2011 | Geyer et al. | 701/108 |
| 8,291,891 | B2 * | 10/2012 | Alger et al. | 123/568.11 |
| 8,627,645 | B2 * | 1/2014 | Hopka et al. | 60/276 |
| 2002/0189598 | A1 * | 12/2002 | Remmels et al. | 123/568.11 |
| 2003/0213230 | A1 * | 11/2003 | Yahata et al. | 60/278 |
| 2006/0185626 | A1 * | 8/2006 | Allen et al. | 123/41.12 |

(Continued)

*Primary Examiner* — Mahmoud Gimie  
*Assistant Examiner* — David Hamaoui  
(74) *Attorney, Agent, or Firm* — GE Global Patent Operation; John A. Kramer

(57) ABSTRACT

Various systems and method for controlling exhaust gas recirculation in an internal combustion engine are provided. In one embodiment, a method for controlling an engine includes determining an actual intake oxygen concentration, adjusting a donor cylinder fuel injection amount to drive the actual intake oxygen concentration to a designated intake oxygen concentration, and adjusting a non-donor cylinder fuel injection amount dependent upon the donor cylinder fuel injection adjustment and to maintain a second operating parameter.

20 Claims, 5 Drawing Sheets

(56) References Cited

U.S. PATENT DOCUMENTS

| | | | |
|---|---|---|---|
| 2009/0199825 A1* | 8/2009 | Piper et al. | 123/568.21 |
| 2009/0308070 A1 | 12/2009 | Alger et al. | |
| 2010/0126142 A1* | 5/2010 | Murata et al. | 60/278 |
| 2010/0292910 A1 | 11/2010 | Gibble | |
| 2011/0041495 A1* | 2/2011 | Yager | 60/605.2 |
| 2011/0253113 A1* | 10/2011 | Roth et al. | 123/568.12 |
| 2012/0204844 A1* | 8/2012 | Gingrich et al. | 123/568.11 |
| 2012/0216530 A1* | 8/2012 | Flynn et al. | 60/605.2 |
| 2012/0323470 A1* | 12/2012 | Klingbeil et al. | 701/108 |
| 2013/0024086 A1* | 1/2013 | Henry et al. | 701/102 |

* cited by examiner

SYSTEMS AND METHODS FOR CONTROLLING EXHAUST GAS RECIRCULATION COMPOSITION

FIELD

Embodiments of the subject matter disclosed herein relate to exhaust gas recirculation (EGR) systems and methods.

BACKGROUND

Exhaust gas recirculation (EGR) is employed in internal combustion engines to control NOx emissions. For example, diesel engines typically operate with a lean air/fuel ratio globally, but during combustion a flame itself burns locally at or near a stoichiometric condition. EGR gas is introduced as a diluent that effectively reduces flame temperatures, and correspondingly reduces nitrogen oxide (NOx) emissions. While adding EGR gas reduces NOx, the reduced flame temperatures can result in an increase in particulate matter (PM). Thus, EGR gas needs to be accurately controlled in order to control both NOx and PM emissions.

In one approach, all exhaust from one or more cylinders is routed back into the intake manifold. These cylinders are referred to as donor cylinders. On the other hand, all exhaust from one or more other cylinders is routed to an exhaust pipe. These cylinders are referred to as non-donor cylinders. In such a configuration, EGR rate is typically controlled through operation of a valve that is located in an EGR passage between an exhaust manifold of the donor cylinders and the intake manifold. The valve position is controlled to vary a mass flow rate of EGR gas provided to the intake manifold.

However, the inventors herein have identified issues with the above described approach. For example, by controlling EGR composition through control of EGR mass flow rate, an oxygen concentration in the intake manifold may be controlled with less accuracy or looser tolerances that result in greater NOx emissions.

BRIEF DESCRIPTION OF THE INVENTION

In one embodiment, a method for controlling an engine includes determining an actual intake oxygen concentration, adjusting a donor cylinder fuel injection amount to drive the actual intake oxygen concentration to a designated intake oxygen concentration, and adjusting a non-donor cylinder fuel injection amount dependent upon the donor cylinder fuel injection adjustment and to maintain a second operating parameter.

By actively controlling intake oxygen concentration through control of the donor cylinder fuel injection amount, tighter tolerances on NOx and PM emissions can be maintained relative to controlling an EGR mass flow rate. Moreover, by cascading the control of the donor cylinders responsive to the intake oxygen concentration with control of the non-donor cylinder fueling, the non-donor cylinder fuel injection amount can be dependent on the donor cylinder fuel injection adjustment and also can actively control another, second operating parameter. In one example where the engine includes a turbocharger having a turbine that is operable by exhaust gas flow from the non-donor cylinders, the non-donor cylinder fuel injection amount is adjusted to a designated boost pressure. As another example, the non-donor cylinder fuel injection amount is adjusted to a designated torque output.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. Also, the inventors herein have recognized any identified issues and corresponding solutions.

BRIEF DESCRIPTION OF THE DRAWINGS

The present invention will be better understood from reading the following description of non-limiting embodiments, with reference to the attached drawings, wherein below.

DETAILED DESCRIPTION

The present description relates to systems and methods for controlling EGR gas composition generated from donor cylinders of an engine. More particularly, the present description relates to control of a first operating parameter of the engine, specifically, adjusting an amount of fuel injected to donor cylinders to actively control an oxygen concentration in the intake manifold that is provided to donor cylinders and non-donor cylinders. Furthermore, the present description relates to adjusting an amount of fuel injected to non-donor cylinders to actively control another, second operating parameter of the engine. As one example, a non-donor cylinder fuel injection amount is adjusted to maintain a total fuel amount provided collectively to all of the cylinders of the engine to meet a designated torque output. For example, a donor cylinder fuel injection amount can be increased and a non-donor cylinder fuel injection amount can be correspondingly decreased to reduce an oxygen concentration of EGR gas that substantially reduces NOx emissions. Although the amount of fuel provided to the donor cylinders is different from the amount of fuel provided to the non-donor cylinders, the total fuel amount is maintained in order to accurately meet torque demand. By actively controlling oxygen/EGR composition instead of EGR mass flow rate, uncontrolled variation in NOx emissions and fuel consumption can be reduced.

As another example, a non-donor cylinder fuel injection amount is adjusted to control a boost pressure. More particularly, in some implementations, the engine includes a turbocharger having a turbine that is operable by exhaust gas from the non-donor cylinders. As such, the non-donor cylinder fuel injection amount is controlled to actively control exhaust gas provided to the turbine in order to more accurately control boost pressure provided by the turbocharger. In some implementations, the non-donor cylinder fuel injection amount is further adjusted based on an ambient altitude as a way to control total airflow to the engine. For example, the non-donor cylinder fuel injection amount may be increased at higher altitudes and decreased at lower altitudes (e.g., sea-level). Through such control, over-boosting or turbocharger by-pass operation at lower altitudes may be reduced or eliminated. In this way, fuel consumption may be reduced and boost pressure control accuracy at peak pressures may be increased.

Figure 1:
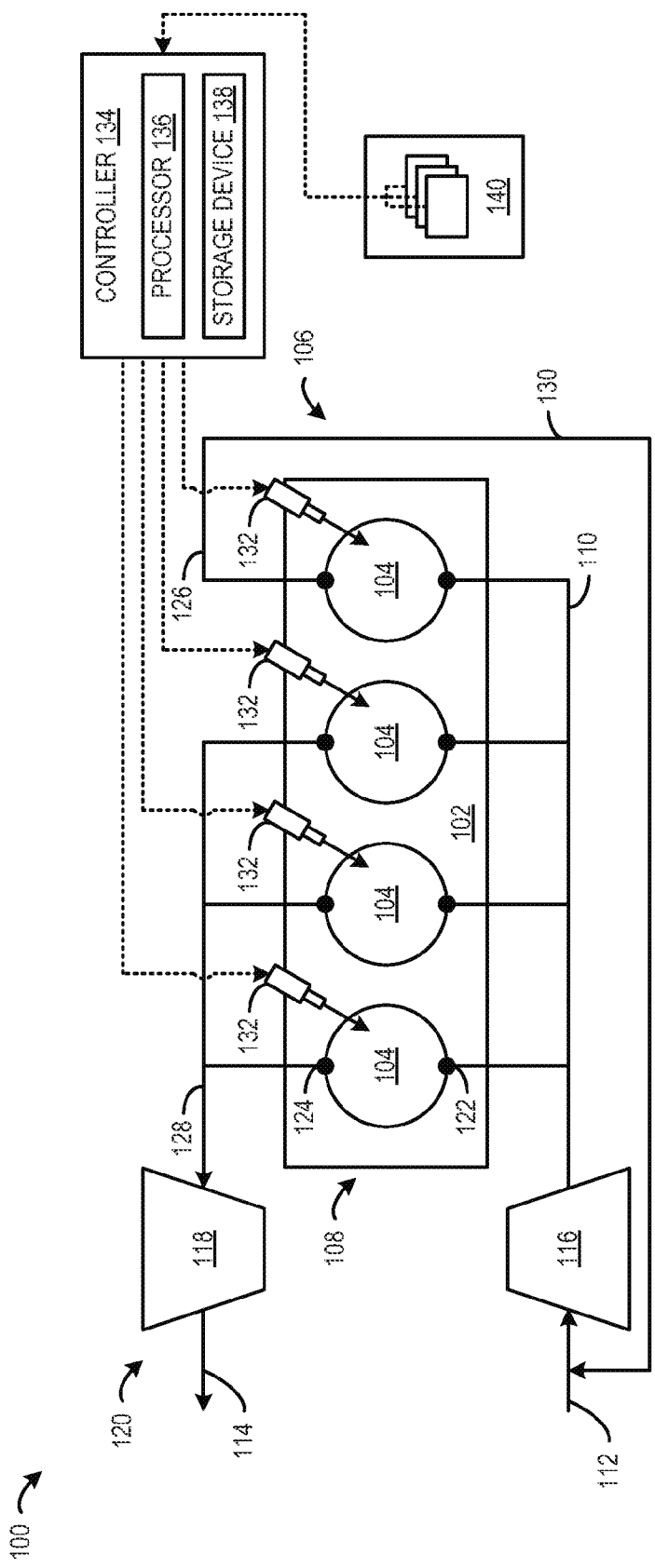
FIG. 1 schematically shows an embodiment of an engine system of the present disclosure.

FIG. 1 shows an embodiment of an engine system 102 coupled to a vehicle 100. For example, the vehicle 100 may include a locomotive, marine vessel, Off-Highway Vehicle (OHV), etc. The engine system 102 includes a plurality of cylinders 104. The plurality of cylinders 104 are organized into one or more donor cylinder groups and one or more non-donor cylinder groups. In particular, the engine system 102 includes a first cylinder group 106 that includes at least a first cylinder and a second cylinder group 108 that includes at least a second cylinder. Note that "first" and "second" are labels to denote the cylinders of the first and second cylinder groups, respectively.

The first cylinder group 106 includes at least one donor cylinder that provides exhaust gas that is directed to an intake manifold 110 of the engine system 102. (Intake manifold refers to a passage or passages that link to cylinder input ports fur providing intake air to the cylinders.) The second cylinder group 108 includes at least one non-donor cylinder that provides exhaust gas that is directed to an exhaust pipe 114. In the illustrated implementation, the first cylinder group 106 includes one donor cylinder that only provides exhaust gas to the intake manifold 110 and the second cylinder group 108 includes three non-donor cylinders that only provide exhaust gas to the exhaust pipe 114. It will be appreciated that each of the cylinder groups may include any suitable number of cylinders. Furthermore, the engine system may include any suitable number of donor cylinder groups and non-donor cylinder groups. In some implementations, a donor cylinder group may selectively provide exhaust gas to an intake manifold and an exhaust pipe through operation of a valve or another control device.

The intake manifold 110 couples to the first cylinder group 106 and the second cylinder group 108. An intake passage 112 supplies fresh air to the intake manifold 110 for combustion. In particular, air enters the intake passage 112 from the environment and passes through a compressor 116 of a turbocharger 120. In the illustrated implementation, the engine system 102 does not include a throttle valve positioned in the intake passage 112. However, in some implementations, the intake passage 112 may include a throttle valve positioned downstream of the compressor 116.

The turbocharger 120 includes the compressor 116, which is coupled to a turbine 118. The turbine 118 is positioned in the exhaust pipe such that exhaust gas provided by the second cylinder group 106 causes the turbine 118 to rotate. Rotation the turbine 118 drives the compressor 116, compressing air passing through the intake passage 112 to increase the mass of air flowing or boost pressure in the intake manifold 110.

Each of the plurality of cylinders 104 includes at least one intake port 122 that is operable to receive combustion air from the intake manifold 110 and at least one exhaust port 124 that is operable to exhaust gas to an exhaust manifold. A first exhaust manifold 126 is coupled to the first cylinder group 106 to receive exhaust gas from the first cylinder group 106. The first exhaust manifold 126 is not coupled to the second cylinder group 108. An EGR passage 130 is coupled between the first exhaust manifold 126 and the intake passage 112. EGR gas flows through the EGR passage 130 into the intake passage 112, where it mixes with fresh intake air and the mixed air is compressed by the compressor 116. The EGR gas and fresh air mixture flows through the intake manifold 110 and is directed to the first cylinder group 106 and the second cylinder group 108. The EGR passage 130 is not coupled to the second exhaust manifold 128 of the second cylinder group 108. In some implementations, an EGR valve is positioned in the EGR passage 130 to control EGR mass flow rate through the EGR passage in addition to controlling EGR composition through active fuel control of the donor cylinder group. In some implementations, the EGR passage 130 does not include an EGR valve or other device to vary a flow rate of EGR gas provided to the intake manifold 110.

A second exhaust manifold 128 is coupled to the second cylinder group 108 to receive exhaust gas from the second cylinder group 108. The second exhaust manifold 128 is not coupled to the first cylinder group 106. The second exhaust manifold 128 couples to the exhaust pipe 114. Exhaust gas provided by the second cylinder group 108 travels from the second exhaust manifold 128, through the turbine 118 of the turbocharger 120, to the exhaust pipe 114. Various aftertreatment devices (not shown) can be provided in the exhaust pipe 114, before and after the turbine 118, to treat the exhaust gas before it is released to the atmosphere.

A plurality of fuel injectors 132 are shown coupled directly to the plurality of cylinders 104 for injecting fuel directly therein in proportion to a pulse width of signals from a controller 134. In this manner, the plurality of fuel injectors 132 provides what is known as direct injection of fuel into the plurality of cylinders 104. Each of the plurality of fuel injectors 132 is independently operable to inject fuel into one of the plurality of cylinders 104. In some implementations, more than one fuel injector may provide fuel to a cylinder. Fuel may be delivered to each of the plurality of fuel injectors 132 by a fuel system (not shown) including a fuel tank, a fuel pump, and a fuel rail. In some implementations, the plurality of fuel injectors 132 may be arranged in intake manifold 110 in a configuration that provides what is known as port injection of fuel into the intake port upstream of the plurality of cylinders 104.

The controller 134 receives various signals from sensors 140 coupled to the engine system 102. The controller 134 may be configured to control EGR based at least in part on the signals. For example, the controller 134 receives sensor signals indicative of air-fuel ratio, engine speed, engine load, engine temperature, ambient temperature, intake manifold temperature, exhaust temperature, intake manifold pressure (boost pressure), exhaust pressure, ambient altitude, intake manifold oxygen concentration, etc. In the illustrated implementation, the controller 134 is a computing device, such as microcomputer that includes a processor unit 136, non-transitory computer-readable storage medium device 138, input/output ports, memory, a data bus, etc. Computer-readable storage medium device 138 is programmable with computer readable data representing instructions executable by the processor unit for performing the methods described below as well as other variants that are anticipated but not specifically listed.

The controller 134 is operable to adjust various actuators in the engine system 102 based on different operating parameters received or derived from different signals received from the plurality of sensors 140. For example, the controller 134 is operable to determine a designated oxygen concentration in the donor cylinder group. The designated oxygen concentration may be a predicted or target oxygen concentration that is achieved through feedback control. The designated oxygen concentration may be determined in any suitable manner. For example, various operating conditions based on engine speed, engine load, engine temperature, boost pressure, etc. can be mapped (e.g., in a look-up table) to a designated oxygen concentration that is provided to all of the engine cylinders. Further, the controller 134 is operable to determine an actual oxygen concentration in donor cylinders and/or non-donor cylinders of the engine during combustion. The actual oxygen concentration may be determined in any suitable manner. For example, an oxygen sensor that is located in the intake manifold may provide a sensor signal to the controller 134 that is indicative of the actual oxygen concentration. As another example, the actual oxygen concentration may be derived from other operation parameters.

The controller 134 is operable to adjust a donor cylinder fuel injection amount to drive the actual oxygen concentration to the designated oxygen concentration, and adjust a non-donor cylinder fuel injection amount dependent upon the donor cylinder fuel injection adjustment and to maintain another, second operating parameter. In one example, the controller 134 is operable to adjust the non-donor cylinder fuel injection amount to a designated torque output provided by the donor cylinders and the non-donor cylinders. In another example, the controller 134 is operable to adjust the non-donor cylinder fuel injection amount to achieve or obtain a designated air fuel ratio provided by the non-donor cylinders. In another example, the controller 134 is operable to adjust the non-donor cylinder fuel injection amount based on a designated boost pressure. Since the turbine 118 of the turbocharger 120 is positioned in the exhaust pipe 114 that is fluidly connected to the non-donor cylinder group, air-fuel ratio and boost pressure can be control targets for actively controlling the non-donor cylinder fuel injection amount.

In some implementations, the controller 134 is operable to control a differential fuel amount between the donor cylinders and the non-donor cylinders. The differential fuel amount is a ratio representative of an amount of fuel provided to a single active donor cylinder and an amount of fuel provided to single active non-donor cylinder. The differential fuel amount can be applied to a designated total fuel amount to determine how much fuel is provided to donor cylinder and non-donor cylinders. Note that by adjusting the differential fuel amount the total amount of fuel may not change, instead the distribution of that total fuel amount between the donor cylinders and non-donor cylinders changes. For example, the controller 134 is operable to adjust a differential fuel injection amount between a donor cylinder fuel injection amount and a non-donor cylinder fuel injection amount responsive to intake oxygen concentration and another, second operating parameter.

In some implementations, the controller 134 is operable to further adjust the non-donor cylinder fuel injection amount based on an ambient altitude. In one example, the controller 134 is operable to increase the non-donor cylinder fuel injection amount at higher altitudes and decrease the non-donor cylinder fuel injection amount at lower altitudes. Stated another way, the controller 134 is operable to control the non-donor cylinder fuel injection amount to a first amount at a first altitude and decrease the non-donor fuel injection amount to a second amount that is less than the first amount at a second altitude that is less than the first altitude. Moreover, there is a greater differential amount between the non-donor cylinder fuel injection amount and the donor cylinder fuel injection amount at higher altitudes, with a higher fuel amount injected to non-donor cylinders than donor cylinders. By providing more fuel to the non-donors cylinder at higher altitudes and less fuel at lower altitudes total airflow provided to the engine can be controlled more accurately. Moreover, by providing less fuel to the non-donor cylinder at lower altitudes over-boost or turbocharger-bypass operation can be reduced or eliminated at lower altitudes. In this way, fuel consumption can be reduced and control accuracy over peak pressures can be increased. As another example, in some cases, the controller 134 is operable to decrease the non-donor fueling at high altitude in order to reduce the likelihood of overly rich operation and smoke issues due to thinner air density.

In some implementations, the controller 134 is operable to, during an acceleration condition where a vehicle is accelerating, during an acceleration condition, to decrease the donor cylinder fuel injection amount, increase the non-donor cylinder fuel injection amount to a greater extent than the non-donor cylinder fuel injection amount during non-acceleration conditions, and advance an injection timing of the non-donor cylinders. The non-acceleration conditions occur when the vehicle is not accelerating, but instead is maintaining a designated speed. In one example during the acceleration condition, donor cylinder fueling is decreased in order to reduce an EGR amount because of transient smoke issues caused by the turbocharger not being able to spool up fast enough to deliver more fresh air to the cylinders. To compensate for the decreased donor fueling, and also to meet the increased power demand brought on by the acceleration condition, the non-donor fueling can be increased beyond non-acceleration conditions and the non-donor injection timing can also be advanced.

As another example, the controller 134 is operable to, during an acceleration condition, increase the donor cylinder fuel injection fueling and advance an injection timing of the non-donor cylinder group to more quickly achieve a designated power output. In other words, usually during acceleration a decrease in fueling to the donor cylinder group may be expected to increase the oxygen concentration because the turbocharger has little time to spool up to provide fresh air. However, the additional power provided by the rich operation of the donor cylinder group and the advanced injection timing of the non-donor cylinder group may provide a greater benefit to increase acceleration and achieve the designated power output more quickly.

In the illustrated implementation, the fuel injector coupled to the single donor cylinder of the first cylinder group 106 injects the donor cylinder fuel injection amount to that donor cylinder. On the other hand, each of the fuel injectors coupled to the non-donor cylinders of the second cylinder group 108 inject the non-donor cylinder fuel injection amount to those cylinders.

In some control situations, the donor cylinder fuel injection amount is the same amount for each donor cylinder and the non-donor cylinder fuel injection amount is the same amount for each non-donor cylinder. However, in some cases, the donor cylinder fuel injection amount and the non-donor cylinder fuel injection amount may be different for different cylinders. Furthermore, the total fuel amount is the sum of the donor fuel injection amount of all of the donor cylinders and the non-donor cylinder fuel injection amount of all on the non-donor cylinders. Note that in some implementations, the controller 134 actively controls the fuel injection amount to control EGR gas composition, and does not control an EGR flow rate through control of an EGR valve position.

In some implementations, the storage medium device 138 includes one or more sets of instructions stored thereon that when carried out by the processor unit 136 of the controller 134 cause the controller to determine a designated oxygen concentration, determine an actual oxygen concentration, generate control signals for controlling the plurality of fuel injectors 132 to adjust the donor cylinder fuel injection amount provided to the first cylinder group 106 to drive the actual oxygen concentration to the designated oxygen concentration, and to adjust the non-donor cylinder fuel injection amount dependent upon the donor cylinder fuel injection adjustment and to maintain another operating parameter.

As an example, in the illustrated implementation, if all four cylinders inject the same fuel injection amount the effective EGR rate would be 25% since exhaust gas from the one donor cylinder is recirculated in the intake manifold out of four total cylinders. If the effective EGR rate is commanded to be 28%, the donor cylinder fuel injection amount is increased to provide a 3% increase in effective EGR rate. In order to maintain the same total fuel amount to accurately provide a demanded torque output, the non-donor cylinder fuel injection amount is decreased to compensate for the 3% increase of the donor cylinder fuel injection amount. Since all of the non-donor cylinders inject the same amount of fuel, the 3% decrease is divided across the total number of non-donor cylinders. In this case, each non-donor cylinder fuel injection amount is decreased to maintain the demanded torque output from the engine. In other words, the non-donor cylinders run lower power to compensate for the higher power operation of the donor cylinder. In this way, EGR can be controlled accurately with less variation in emissions and fuel economy.

Figure 2:
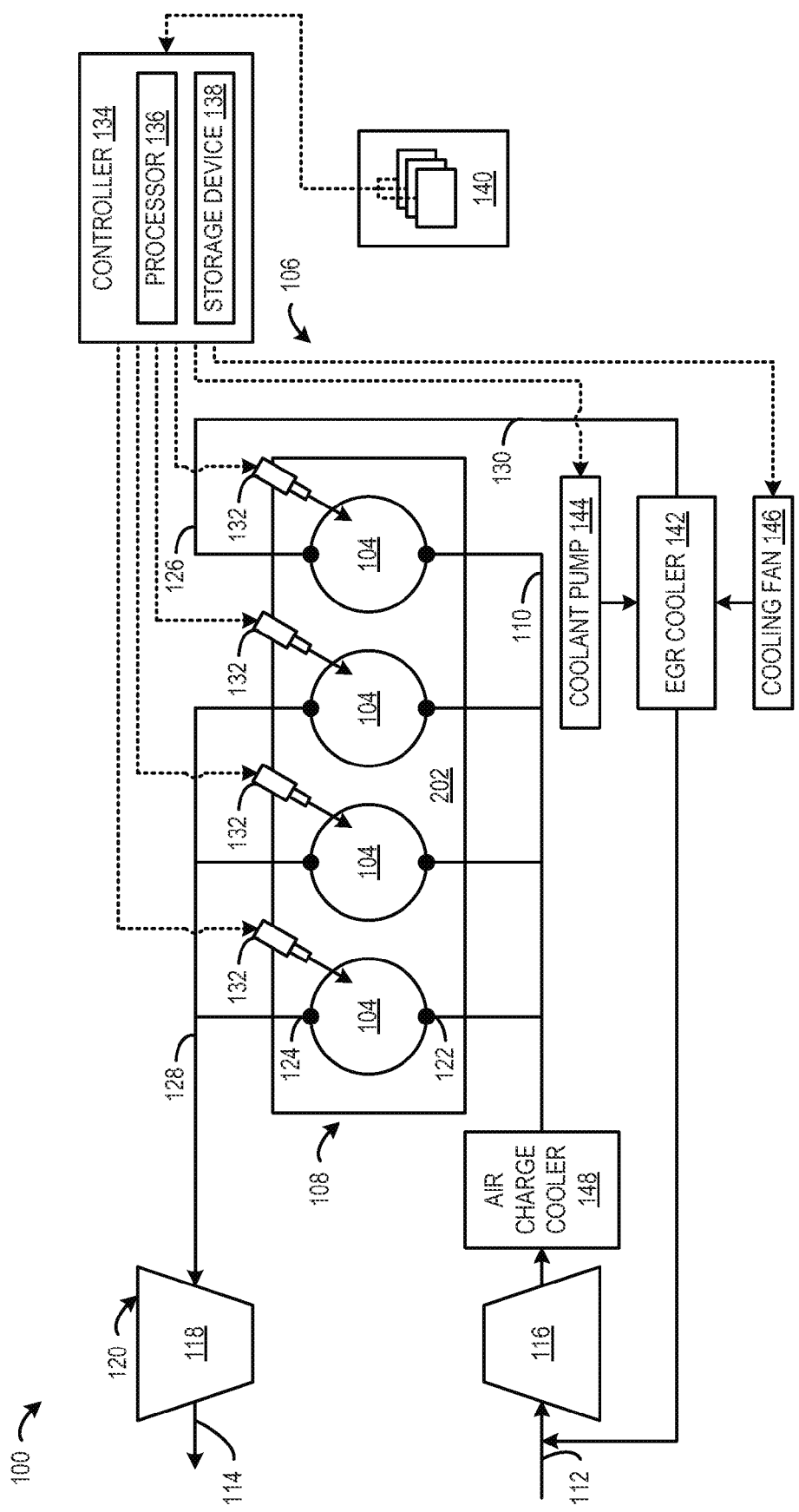
FIG. 2 schematically shows another embodiment of an engine system of the present disclosure.

FIG. 2 shows another embodiment of an engine system 202. The engine system 202 includes components that are actively controlled to manipulate EGR gas based on the EGR composition or effective EGR rate provided by the donor cylinder. For example, components are actively controlled to change an EGR gas temperature as EGR composition or the effective EGR rate changes. Components of the engine system 102 that may be substantially the same as those of the engine system 202 are identified in the same way and are described no further. However, it will be noted that components identified in the same way in different implementations of the present disclosure may be at least partly different.

An EGR cooler 142 is positioned in the EGR passage 130, between the first exhaust manifold 126 and the intake manifold 110. The EGR cooler 142 may be an engine or other liquid coolant cooled cooler, an air cooled cooler, or a combination thereof. As an example, the EGR cooler 142 is in fluid communication with a liquid coolant or other coolant to cool the exhaust gases from the first cylinder group 106 as the gas passes through to the intake manifold 110. A coolant pump 144 is operable to provide coolant through the EGR cooler. The coolant pump 144 is a variable speed pump that is operable to pump coolant at varying rates as controlled by the controller 134. The controller 134 is operable to adjust operation of the coolant pump 144 to adjust coolant flow through the EGR cooler 142 in response to the donor cylinder fuel injection amount.

As one example, under some conditions, in order to drive an actual oxygen concentration to a designated or commanded oxygen concentration, this requires an increase in the donor cylinder fuel injection amount. The increase in the fuel amount causes an increase in combustion temperature and exhaust gas temperature. To compensate for the increase in exhaust gas temperature, the controller 134 controls operation of the coolant pump 144 to increase a coolant flow rate through the EGR cooler 142 in response to the increase in the donor cylinder fuel injection amount. By varying operation of the coolant pump 144 based on the donor cylinder fuel injection amount, EGR gas temperature can be controlled to provide increased control accuracy of fresh charge temperatures and a reduction of energy consumption of the EGR cooling system.

Furthermore, with operation the EGR cooler 142 may become fouled due to a buildup of PM in passages of the EGR cooler 142. EGR cooler fouling may cause a restriction in EGR gas flow and may reduce the cooling effectiveness of the EGR cooler on the EGR gas. In order to reduce the PM buildup in the EGR cooler 142, the controller 134 is operable, during an EGR cooler fouling condition, to adjust the donor cylinder fuel injection amount relative to a fuel injection amount during a non-EGR cooler fouling condition (e.g., normal operation) to adjust the exhaust temperature to a temperature level suitable to oxidize or dry out and flake off the PM buildup in the EGR cooler 142.

The EGR cooler fouling condition includes any suitable period where the donor cylinder fuel injection amount is adjusted to remove PM buildup. For example, the EGR cooler fouling condition may occur repeatedly after a threshold duration, such as a number of engine cycles, a time period, or a number of miles traveled. As another example, an EGR cooler fouling condition may occur in response to an exhaust backpressure becoming greater than a pressure threshold or an exhaust gas flow rate being less than a mass flow rate threshold. As yet another example, an EGR cooler fouling condition may be determined based on an effectiveness of the EGR cooler based on a temperature differential of coolant or exhaust gas into and out of the EGR cooler.

In an embodiment, a cooling fan 146 is operable to provide air flow to the EGR cooler 142. In particular, the cooling fan 146 provides air flow across the exterior of the EGR cooler 142 to facilitate heat transfer. The cooling fan 146 is variably controlled by the controller 134. The controller 134 is operable to adjust operation of the cooling fan 146 to adjust air flow provided to the EGR cooler 142 in response to adjustment of the donor cylinder fuel injection amount. In some implementations, the cooling fan 146 includes a variable speed motor, and the controller 134 adjusts a speed of the cooling motor to provide more or less air flow. In some implementations, the cooling fan 146 includes variable pitch fan blades, and the controller 134 adjusts a fan blade pitch of the cooling fan 146 to provide more or less air flow.

As one example, under some conditions, in order to drive an actual oxygen concentration to a designated or commanded oxygen concentration, an increase in the donor cylinder fuel injection amount is required. The increase in the fuel injection amount causes an increase in combustion temperature and exhaust gas temperature. To compensate for the increase in exhaust gas temperature, the controller 134 controls operation of the cooling fan 146 to increase air flow provided to the EGR cooler 142 in response to the increase in the donor cylinder fuel injection amount or an increase in the degree of fueling differential between the donor cylinders and the non-donor cylinders. By varying operation of the cooling fan 146 based on donor cylinder fuel injection amount, EGR gas temperature can be controlled to provide increased control accuracy of fresh charge temperatures and a reduction of energy consumption of the EGR cooling system.

A charge air cooler 148 is positioned in the intake passage 112 downstream of the compressor 116 and upstream of the intake manifold 110. In some implementations, the charge air cooler 148 is in fluid communication with a liquid coolant and cools compressed air before the air is directed to the engine system 202 via the intake manifold 110. Additionally, the liquid coolant may be the same coolant as supplied to the EGR cooler 142, or a different coolant. In some implementations of the engine system 202 (and 102), the turbocharger 120 is not included. In some implementations of the engine system 202 (and 102), the charge air cooler 148 is not included.

Figure 3:
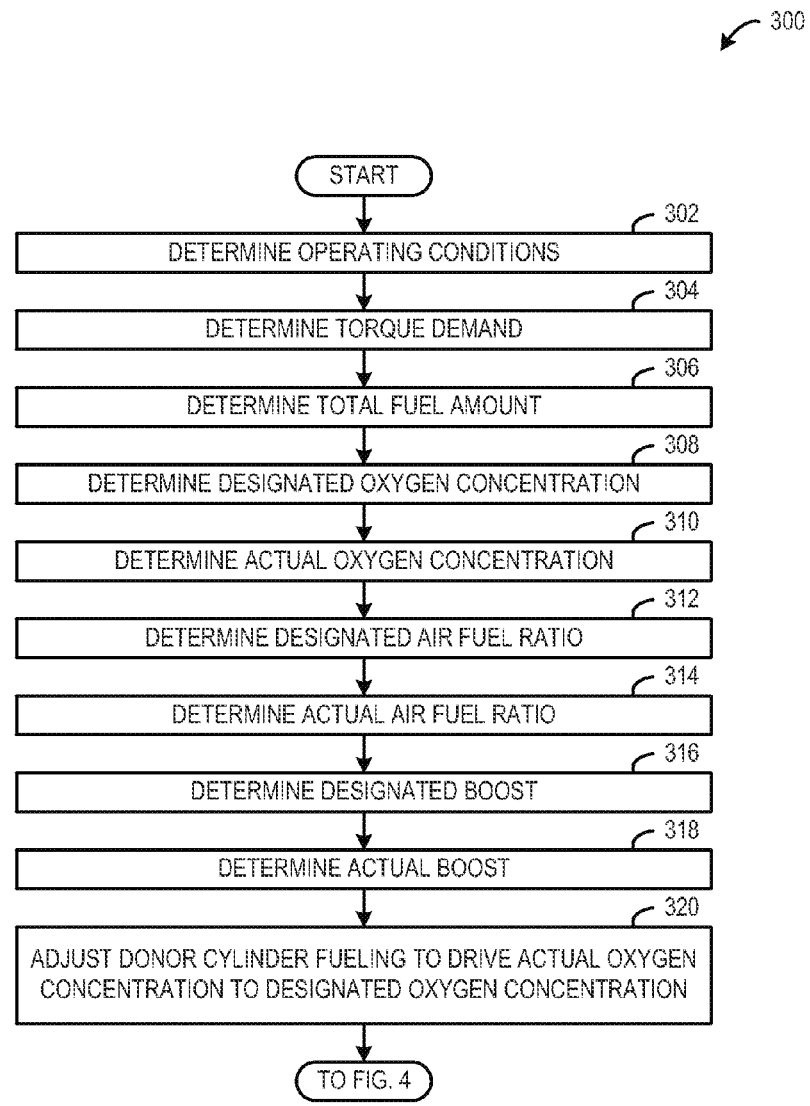
FIGS. 3-4 show a flow diagram of an embodiment of a method for controlling fueling in an engine.
Figure 4:
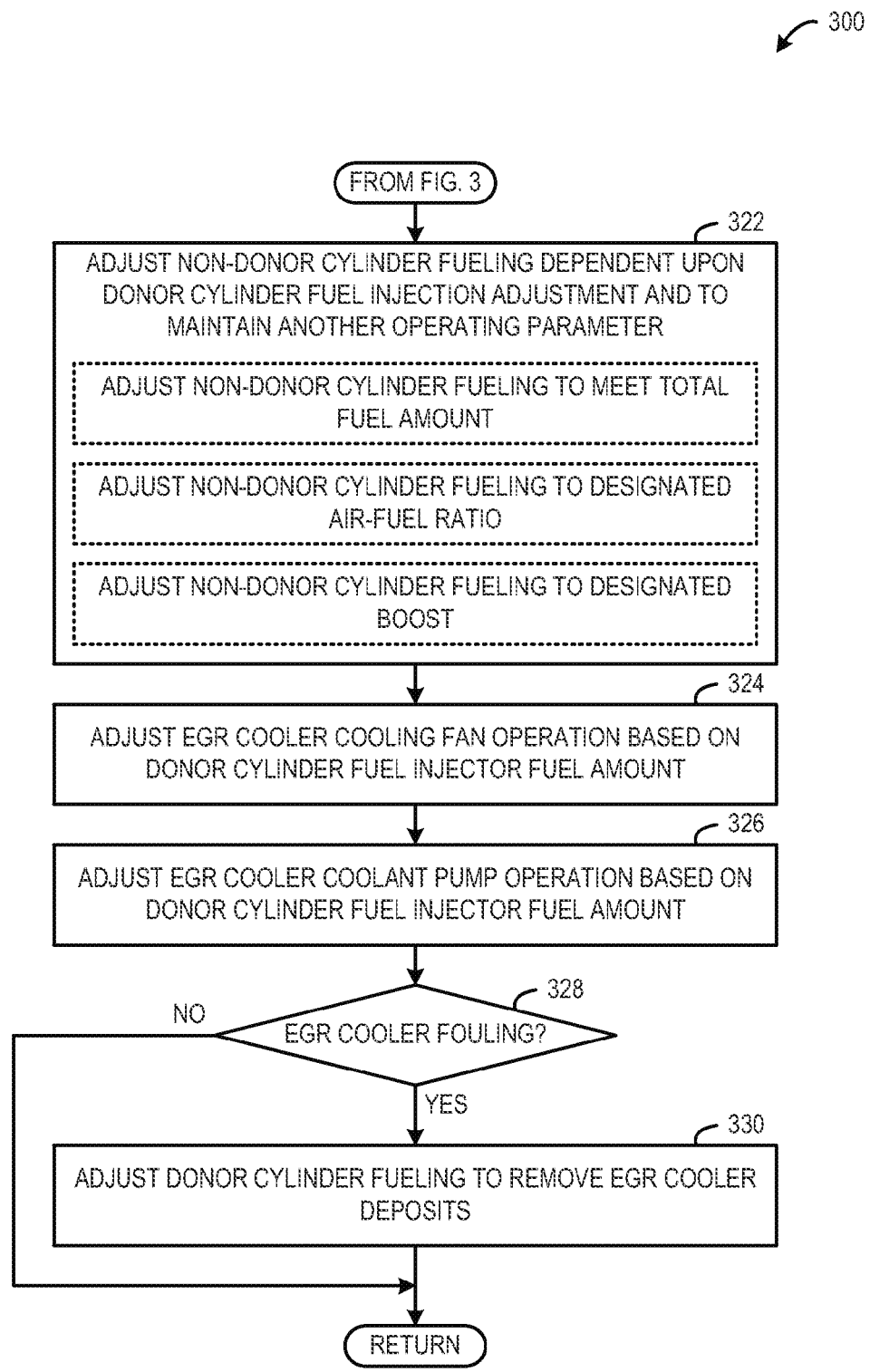

FIGS. 3-4 show a flow diagram of an embodiment of a method 300 for controlling fuel injection in an engine to actively control EGR gas composition and other operating parameters. In one example, the method 300 is executable by the controller 134 shown in FIGS. 1 and 2. At 302, the method 300 includes determining operating conditions. The controller 134 determines operating conditions based on operating parameters indicative of sensor signals received from sensors 140 coupled to the engine system 102 or 202. For example, signals provided from sensors 140 that are received by the controller 134 include air-fuel ratio, engine temperature, notch position, engine speed, intake manifold temperature, intake manifold pressure (boost pressure), exhaust temperature, exhaust pressure, ambient temperature, ambient altitude, etc.

At 304, the method 300 includes determining a torque demand. The torque demand may be determined based on a notch position. The notch position is a steady state commanded power output that is controlled by a locomotive operator. A notch position is provided by a stepped or "notched" control input device (a.k.a. a throttle) that produces electrical signals corresponding to different speeds and loads of the engine. The torque demand is an amount of torque output provided by the engine system. The torque demand may be determined in any suitable manner.

At 306, the method 300 includes determining a total fuel amount based on the torque demand. The total fuel amount is an amount of fuel required to be injected to all of the cylinders of the engine to produce combustion in order to output the torque demand.

At 308, the method 300 includes determining a designated oxygen concentration that is provided to the donor cylinders and the non-donor cylinder during combustion. The designated oxygen concentration may be determined based on operation conditions. For example, the designated oxygen concentration may be calculated using operation maps where engine speed, engine load, ambient temperature, etc. are mapped to the designated oxygen concentration. The designated oxygen concentration may be determined in any suitable manner.

At 310, the method 300 includes determining an actual oxygen concentration. In one example, the actual oxygen concentration that is provided to the donor cylinders and the non-donor cylinder during combustion is determined based on a sensor signal received from an oxygen sensor positioned in the intake manifold. In another example, the actual oxygen concentration is derived from other operating parameters. In some implementations, determining the actual oxygen concentration includes receiving data of the actual intake oxygen concentration from a source, such as a sensor or a different control unit. The actual oxygen concentration may be determined in any suitable manner.

At 312, the method 300 includes determining a designated air-fuel ratio that is produced by the non-donor cylinders. The designated air-fuel ratio may be determined based on operating conditions. For example, the designated air-fuel ratio may be calculated using operation maps where engine speed, engine load, exhaust temperature, etc. are mapped to the air-fuel ratio. The designated air-fuel ratio may be determined in any suitable manner.

At 314, the method 300 includes determining an actual air-fuel ratio that is produced by the non-donor cylinders. In one example, the actual air-fuel ratio that is produced by the non-donor cylinders is determined based on a sensor signal received from an exhaust sensor positioned in the exhaust pipe. In another example, the actual air-fuel ratio is derived from other operating parameters. The actual air-fuel ratio may be determined in any suitable manner.

At 316, the method 300 includes determining a designated boost pressure in the intake manifold that is provided to the donor cylinders and the non-donor cylinder during combustion. The designated boost pressure may be determined based on operation conditions. For example, the designated boost pressure may be calculated using operation maps where engine speed, engine load, ambient temperature, exhaust temperature, etc. are mapped to the designated boost pressure. The designated boost pressure may be determined in any suitable manner.

At 318, the method 300 includes determining an actual boost pressure that is produced by exhaust flow from the non-donor cylinders. In one example, the actual boost pressure is determined based on a sensor signal received from a pressure sensor positioned in the intake manifold. In another example, the actual boost pressure is derived from other operating parameters. The actual boost pressure may be determined in any suitable manner.

At 320, the method 300 includes adjusting a donor cylinder fuel injection amount to drive the actual oxygen concentration to the designated oxygen concentration.

At 322, the method 300 includes adjusting a non-donor cylinder fuel injection amount dependent upon the donor cylinder fuel injection adjustment and to maintain another operating parameter. In one example, the method 300 includes adjusting the non donor cylinder fuel injection amount to the total fuel amount in order to meet the torque demand. It is assumed that all donor cylinders receive the same donor cylinder fuel injection amount and all non-donor cylinders receive the same non-donor cylinder fuel injection amount. However, in some implementations, the donor cylinder fuel injection amount may be differently adjusted for different donor cylinders and the non-donor cylinder fuel injection amount may be differently adjusted for different non-donor cylinders. In some cases, the donor cylinder fuel injection amount is adjusted to a different amount than the non-donor cylinder fuel injection amount to account for a variation in the oxygen concentration or amount of air delivered to the individual cylinders. For example, if the donor cylinder fuel injection amount is increased to provide the designated oxygen concentration, then the non-donor cylinder fuel injection amount is decreased to meet the total fuel amount to provide the demanded torque output.

In another example, the method 300 includes adjusting the non-donor cylinder fuel injection amount to the designated air-fuel ratio. In yet another example, the method 300 includes adjusting the non-donor cylinder fuel injection amount to meet the designated boost pressure. In these cases, the non-donor cylinder fuel injection amount is a control target since exhaust from the donor cylinders does not contribute to an air fuel ratio measured (or derived) in the exhaust pipe. Further, only exhaust gas provided by the non-donor cylinders causes rotation of the turbine of the turbocharger, since exhaust gas from the donor cylinders is routed to the intake manifold.

At 324, the method 300 includes adjusting operation of a cooling fan to adjust air flow provided to an EGR cooler through which exhaust gas provided by the donor cylinder group flows, in response to adjustment of the donor cylinder fuel injection amount. For example, if the oxygen concentration is decreased (or an effective EGR rate is increased) which causes an increase in the donor cylinder fuel injection amount, then operation of the cooling fan is adjusted to increase air flow provided to the EGR cooler to mitigate an increase in EGR temperature. In some implementations, adjusting operation of the cooling fan includes adjusting a speed of the cooling fan. In some implementations, adjusting operation of the cooling fan includes adjusting a fan blade pitch of the cooling fan.

At 326, the method 300 includes adjusting operation of a coolant pump to adjust coolant flow through an EGR cooler in response to adjustment of the donor cylinder fuel injection amount. For example, if the oxygen concentration is decreased (or the effective EGR rate is increased) which causes an increase in donor cylinder fuel injection amount, then operation of the coolant pump is adjusted to increase coolant flow through the EGR cooler to mitigate an increase in EGR temperature.

At 328, the method 300 includes determining if there is a cooler fouling condition. In some cases, a cooler fouling condition occurs repeatedly after a duration such as a selected time, a number of engine cycles, a number of miles traveled, etc. In some cases, a cooler fouling condition occurs when all EGR gas pressure is greater than a pressure threshold that indicates that the EGR cooler is restricting exhaust gas flow. In some cases, a cooler fouling condition occurs when an EGR gas temperature is greater than a temperature threshold indicating that the EGR cooler is not effectively cooling EGR gas. If it is determined that there is a cooler fouling condition the method 300 moves to 318. Otherwise, there is not a cooler fouling condition, and the method 300 returns to other operations.

At 330, the method 300 includes adjusting the donor cylinder fuel injection amount to increase the EGR gas temperature. In some cases, adjusting the donor cylinder fuel injection amount includes increasing the donor cylinder fuel injection amount relative to a fuel injection amount during a non-EGR cooler fouling condition (e.g., normal operation). In one example, the EGR gas temperature is increased to greater than a temperature threshold suitably high enough to for the PM deposits to oxidize, dry out, or flake off in the EGR cooler. The EGR gas temperature may be increased through the increase in fuel injection amount for a selected duration that is suitably long enough to remove the PM deposits from the interior of the EGR cooler and travel to the intake manifold for combustion.

By controlling the donor cylinder fuel injection amount to actively control oxygen concentration and controlling the non-donor cylinder to actively control another operating parameter, engine operating efficiency may be increased while reducing NOx and PM emissions.

Figure 5:
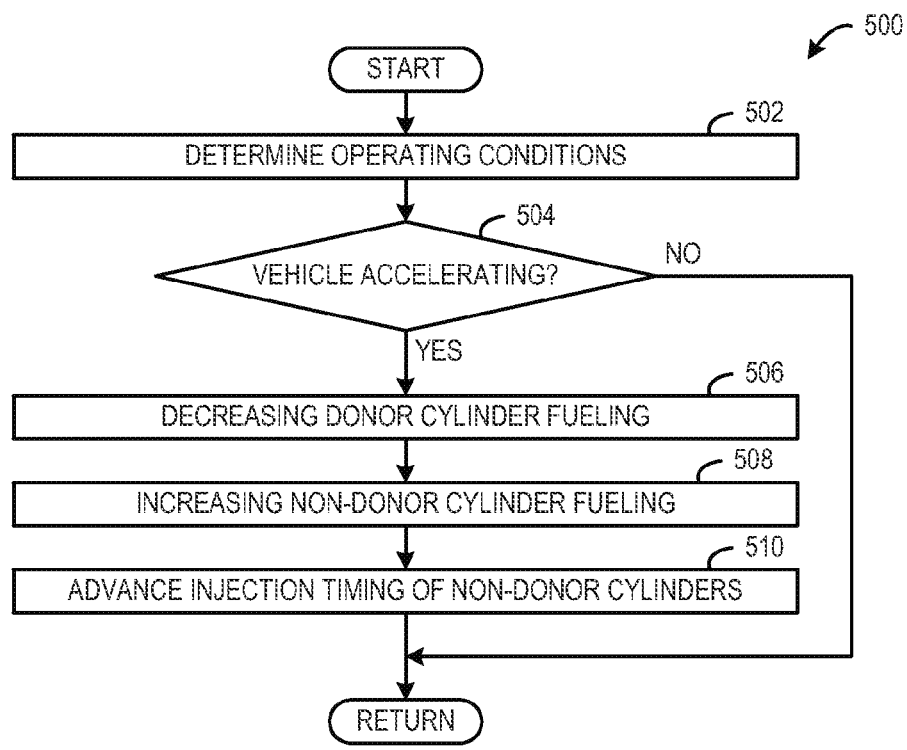
FIG. 5 shows a flow diagram of an embodiment of a method for controlling an engine during an acceleration condition.

FIG. 5 shows a flow diagram of an embodiment of a method 500 for controlling an engine to actively control EGR gas composition and other operating parameters during an acceleration condition. In one example, the method 500 is executable by the controller 134 shown in FIGS. 1 and 2. At 502, the method 500 includes determining operating conditions. The controller 134 determines operating conditions based on operating parameters indicative of sensor signals received from sensors 140 coupled to the engine system 102 or 202.

At 504, the method 500 includes determining if there is an acceleration condition. An acceleration condition may occur when a vehicle speed is increasing as demanded which produces an increase in engine load and the engine output is increasing to meet the demanded engine load. For example, in a locomotive vehicle, an acceleration condition occurs when a notch position is increased and the locomotive accelerates to the steady state speed set-point of the higher notch. If it is determined that there is an acceleration condition, the method 500 moves to 506. Otherwise, there is not an acceleration condition, and the method 500 returns to other operations.

At 506, the method 500 includes decreasing the donor cylinder fuel injection amount. The donor cylinder fuel injection amount is decreased in order to reduce the amount of EGR gas produced during combustion. The amount of EGR gas is reduced in order to reduce the likelihood of transient smoke issues caused by the turbocharger not being able to spool up fast enough to deliver more fresh air during the acceleration condition.

At 508, the method 500 includes increasing the non-donor cylinder fuel injection amount. In some cases, the non-donor cylinder fuel injection amount may be increased beyond the non-donor cylinder fuel injection amount during non-acceleration conditions. The non-donor cylinder fuel injection amount is increased to compensate for the reduced donor cylinder fueling, and also to meet the increased power demand due to the acceleration condition.

At 508, the method 500 includes advancing an injection timing of the non-donor cylinder group. The injection timing of the non-donor cylinder group is advanced to increase power output produced by the non-donor cylinder group to meet the power output demand during the acceleration condition.

By increasing the non-donor cylinder fuel injection amount and advancing injection timing of the non-donor cylinder group during an acceleration condition, power output may be increased more quickly to a rated power in order to accelerate faster.

Figure 6:
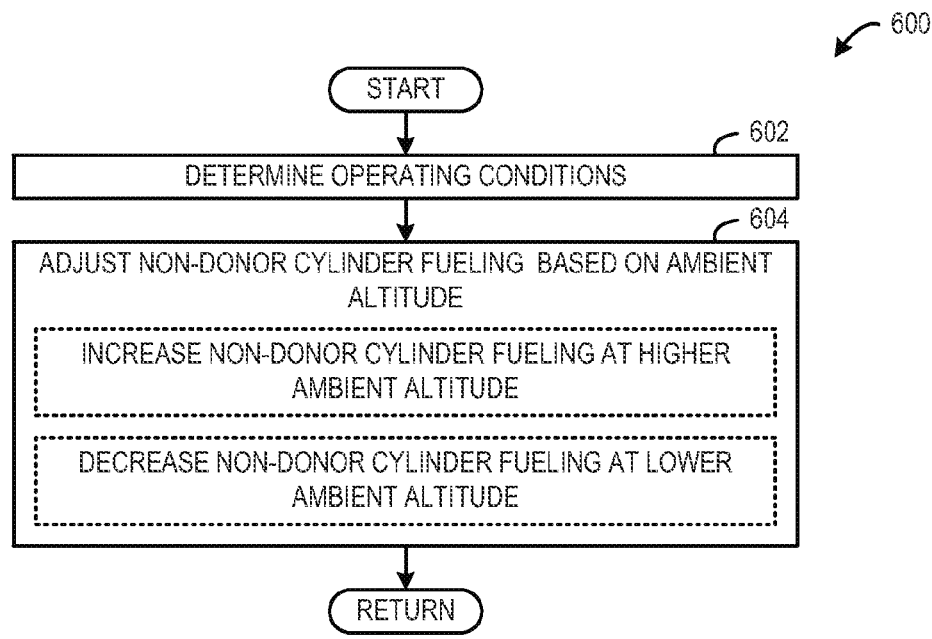
FIG. 6 shows a flow diagram of an embodiment of a method for controlling fueling based on an ambient altitude.

FIG. 6 shows a flow diagram of another embodiment of a method 600 for controlling fueling of an engine. In one example, the method 600 is executable by the controller 134 shown in FIGS. 1 and 2. At 602, the method 600 includes determining operating conditions. The controller 134 determines operating conditions based on operating parameters indicative of sensor signals received from sensors 140 coupled to the engine system 102 or 202. For example, determining operating conditions may include determining an ambient altitude. An ambient altitude may be the altitude at which the engine or vehicle is positioned. In one example, the ambient altitude is determined by an altitude sensor (e.g., an altimeter/barometer) that derives altitude from barometric pressure. Ambient altitude can be measured relative to any suitable reference, such as mean sea level, above ground level, etc. In another example, the ambient altitude is derived from other operating parameters, such as barometric pressure, humidity, and temperature. As yet another example, ambient altitude may be determined based on global position system sensor signals. The ambient altitude may be determined in any suitable manner.

At 604, the method 600 includes adjusting a non-donor cylinder fuel injection amount based on an ambient altitude. For example, adjusting the non-donor cylinder fuel injection amount may include increasing the non-donor cylinder fuel injection amount at higher altitudes and decreasing the non-donor cylinder fuel injection amount at lower altitudes. Stated another way, the method includes setting the non-donor cylinder fuel injection amount to a first amount at a first altitude and decreasing the non-donor fuel injection amount to a second amount the is less than the first amount at a second altitude that is less than the first altitude. Moreover, a differential between the donor cylinder fuel injection amount and the non-donor cylinder fuel injection amount is greater at higher altitudes, with a higher fuel amount injected to non-donor cylinders than the donor cylinders. On the other hand, at lower altitudes, the differential between the donor cylinder fuel injection amount and the non-donor cylinder fuel injection amount is less. In some cases, the fuel amount injected to non-donor cylinders is less than the donor cylinders. In some cases, the donor cylinder fuel injection amount may be adjusted to compensate for the adjustment in the non-donor cylinder fuel injection amount. In some cases, the donor cylinder fuel injection amount may not be adjusted in response to adjustment of the non-donor cylinder fuel injection amount.

Note that the donor cylinder fuel injection amount and the non-donor cylinder fuel injection amount are per cylinder amounts. In other words, the fuel amounts are provided to each firing cylinder. For example, although the donor cylinder fuel injection amount may be higher than the non-donor cylinder fuel injection amount, if there are more non-donor cylinders a collective amount of fuel provided to all of the non-donor cylinders may be greater than the amount of fuel provided to all of the donor cylinders.

By providing more fuel to the non-donors cylinder at higher altitudes and less fuel at lower altitudes total airflow provided to the engine can be controlled more accurately by compensating for changes in boost pressure due to the changes in ambient altitude. Moreover, by providing less fuel to the non-donor cylinder at lower altitudes over-boost or turbocharger-bypass operation can be reduced or eliminated at lower altitudes. In this way, fuel consumption can be reduced and control accuracy over peak pressures can be increased.

As another example, in some cases, the method may include decreasing the non-donor fueling at high altitude in order to reduce the likelihood of smoke issues due to thinner air density.

Another embodiment relates to a system for controlling an engine. The system includes a control module configured to determine an actual intake oxygen concentration, e.g., an actual oxygen concentration in an intake manifold of the engine. Determining the actual intake oxygen concentration may include receiving data of the actual intake oxygen concentration. The control module is further configured to adjust a donor cylinder fuel injection amount (e,g., by generating first control signals for controlling fuel injectors of the engine) to drive the actual intake oxygen concentration (a first operating parameter) to a designated intake oxygen concentration. The designated intake oxygen concentration may be a set value, or determined from or based on operational conditions of the engine (or system in which the engine is deployed), e.g., with reference to a look-up table or the like. The control module is further configured to adjust a non-donor cylinder fuel injection amount (e.g., by generating second control signals for controlling the fuel injectors) dependent upon the donor cylinder fuel injection adjustment. (In other embodiments, the control module is further configured to adjust the non-donor cylinder fuel injection amount to maintain a second operating parameter of the engine.) The control module may include hardware and/or software (e.g., a tangible non-transitory medium, readable by an electronic device, having one or more sets of instructions stored thereon that when executed by the electronic device cause the electronic device to perform one or more functions according to the content of the instructions), and may be a standalone unit or deployed on or in conjunction with a control system that also performs other functions in the engine system, vehicle, or otherwise.

Another embodiment relates to a system for controlling an engine. The system includes a control module configured to determine an actual intake oxygen concentration, e.g., an actual oxygen concentration in an intake manifold of the engine. Determining the actual intake oxygen concentration may include receiving data of the actual intake oxygen concentration. The control module is further configured to adjust a donor cylinder fuel injection amount (e.g., by generating first control signals for controlling fuel injectors of the engine) to drive the actual intake oxygen concentration (a first operating parameter) to a designated intake oxygen concentration. The designated intake oxygen concentration may be a set value, or determined from or based on operational conditions of the engine (or system in which the engine is deployed), with reference to a look-up table or the like. The control module is further configured to adjust a non-donor cylinder fuel injection amount (e.g., by generating second control signals for controlling the fuel injectors) based on a designated boost pressure provided by a turbocharger having a turbine that is operable by exhaust flow provided by at least one non-donor cylinder of a non-donor cylinder group. The control module may include hardware and/or software (e.g., a tangible non-transitory medium, readable by an electronic device, having one or more sets of instructions stored thereon that when executed by the electronic device cause the electronic device to perform one or more functions according to the content of the instructions), and may be a standalone unit or deployed on or in conjunction with a control system that also performs other functions in the engine system, vehicle, or otherwise.

In the appended claims, the terms "including," "includes," and "in which" are used as the plain-language equivalents of the respective terms "comprising," "comprises," and "wherein." Moreover, in the following claims, the terms "first," "second," "third," "upper," "lower," "bottom," "top," etc. are used merely as labels, and are not intended to impose numerical or positional requirements on their objects. Additionally, as used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:
1. A method, comprising:
determining a sensed intake oxygen concentration;
adjusting a donor cylinder fuel injection amount to drive the sensed intake oxygen concentration to a designated oxygen concentration;
adjusting a non-donor cylinder fuel injection amount based on a designated boost pressure provided by a turbocharger having a turbine that is operable by exhaust flow provided by at least one non-donor cylinder, wherein adjusting the non-donor cylinder fuel injection amount comprises maintaining the designated boost pressure by adjusting the non-donor cylinder fuel injection amount, and meeting a total fuel demand by further adjusting the non-donor cylinder fuel injection amount in response to the adjusted donor cylinder fuel injection amount;

adjusting the non-donor cylinder fuel injection amount based on an ambient altitude, wherein adjusting the non-donor cylinder fuel injection amount based on the ambient altitude comprises providing a higher differential amount between the non-donor cylinder fuel injection amount and the donor cylinder fuel injection amount at higher altitudes, and providing a lower differential amount between the non-donor cylinder fuel injection amount and the donor cylinder fuel injection amount at lower altitudes;

adjusting operation of a cooling fan to adjust air flow provided to an EGR cooler through which exhaust gas provided by a donor cylinder group flows in response to adjustment of the donor cylinder fuel injection amount, where adjusting operation of the cooling fan comprises adjusting one or more of a speed of the cooling fan or a fan blade pitch of the cooling fan;

adjusting operation of a coolant pump to adjust coolant flow through the EGR cooler in response to adjustment of the donor cylinder fuel injection amount; and during an EGR cooler fouling condition, increasing the donor cylinder fuel injection amount relative to the non-donor cylinder fuel injection amount during a non-EGR cooler fouling condition.

2. The method of claim 1, wherein adjusting the non-donor cylinder fuel injection amount based on the ambient altitude includes increasing the non-donor cylinder fuel injection amount at higher altitudes and decreasing the non-donor cylinder fuel injection amount at lower altitudes.

3. The method of claim 1, further comprising, during an acceleration condition:
decreasing the donor cylinder fuel injection amount;
increasing the non-donor cylinder fuel injection amount to a greater extent than the non-donor cylinder fuel injection amount during non-acceleration conditions; and
advancing an injection timing of the at least one non-donor cylinder.

4. The method of claim 1, wherein adjusting the donor cylinder fuel injection amount comprises injecting a same adjusted donor cylinder fuel injection amount to each of a plurality of donor cylinders of an engine, and wherein adjusting the non-donor cylinder fuel injection amount comprises injecting a same adjusted non-donor cylinder fuel injection amount to each of a plurality of non-donor cylinders of the engine.

5. The method of claim 1, wherein adjusting the donor cylinder fuel injection amount comprises differently adjusting a donor cylinder fuel injection amount to one or more donor cylinders of an engine relative to one or more other donor cylinders of the engine, and wherein adjusting the non-donor cylinder fuel injection amount comprises differently adjusting a non-donor cylinder fuel injection amount to one or more non-donor cylinders of the engine relative to one or more other non-donor cylinders of the engine.

6. The method of claim 1, wherein adjusting operation of the cooling fan comprises if the donor cylinder fuel injection amount increases, then adjusting operation of the cooling fan to increase air flow provided to the EGR cooler.

7. The method of claim 1, wherein adjusting operation of the coolant pump comprises if the donor cylinder fuel injection amount increases, adjusting operation of the coolant pump to increase coolant flow through the EGR cooler.

8. The method of claim 1, further comprising determining the designated oxygen concentration based on one or more of engine speed, engine load, or ambient temperature.

9. The method of claim 1, wherein at both higher altitudes and lower altitudes, the non-donor cylinder fuel injection amount is higher than the donor cylinder fuel injection amount.

10. A system comprising:
a donor cylinder group including at least a first cylinder;
a non-donor cylinder group including at least a second cylinder;
a plurality of fuel injectors operable to inject fuel into the first and second cylinders;
an intake passage coupled to the donor cylinder group and the non-donor cylinder group;
an EGR passage coupled between the donor cylinder group and the intake passage, and not coupled to the non-donor cylinder group;
an EGR cooler positioned in the EGR passage;
a coolant pump in fluid communication with the EGR cooler;
a cooling fan operable to provide air flow to the EGR cooler;
an exhaust pipe coupled to the non-donor cylinder group and not coupled to the donor cylinder group;
a turbocharger including a compressor coupled to the intake passage and a turbine coupled to the exhaust pipe, the turbine operable by exhaust flow provided by at least one non-donor cylinder; and
a controller operable to:
determine a sensed intake oxygen concentration,
adjust a donor cylinder fuel injection amount to drive the sensed intake oxygen concentration to a designated oxygen concentration,
adjust a non-donor cylinder fuel injection amount based on a designated boost pressure provided by the turbocharger,
adjust operation of the coolant pump based on the adjustment of the donor cylinder fuel injection amount,
adjust operation of the cooling fan in response to adjustment of the donor cylinder fuel injection amount, and
during an EGR cooler fouling condition, adjust the donor cylinder fuel injection amount relative to a donor cylinder fuel injection amount during a non-EGR cooler fouling condition.

11. The system of claim 10, wherein the controller is operable to adjust the non-donor cylinder fuel injection amount based on an ambient altitude.

12. The system of claim 11, wherein the controller is operable to adjust the non-donor cylinder fuel injection amount based on the ambient altitude by increasing the non-donor cylinder fuel injection amount at higher altitudes and decreasing the non-donor cylinder fuel injection amount at lower altitudes.

13. The system of claim 11, wherein the controller is operable to adjust the non-donor cylinder fuel injection amount based on the ambient altitude by providing a higher differential amount between the non-donor cylinder fuel injection amount and the donor cylinder fuel injection amount at higher altitudes, and providing a lower differential amount between the non-donor cylinder fuel injection amount and the donor cylinder fuel injection amount at lower altitudes.

14. The system of claim 11, wherein at both higher altitudes and lower altitudes, the non-donor cylinder fuel injection amount is higher than the donor cylinder fuel injection amount.

15. The system of claim 10, wherein the controller is further operable to, during an acceleration condition:
decrease the donor cylinder fuel injection amount;

increase the non-donor cylinder fuel injection amount to a greater extent than the non-donor cylinder fuel injection amount during non-acceleration conditions; and advance an injection timing of the at least one non-donor cylinder.

16. The system of claim 10, wherein the controller is further operable to meet a total fuel demand by further adjusting the non-donor cylinder fuel injection amount in response to the adjusted donor cylinder fuel injection amount.

17. The system of claim 10, wherein the controller is operable to adjust the donor cylinder fuel injection amount by injecting a same adjusted donor cylinder fuel injection amount to each of a plurality of donor cylinders of an engine, and adjust the non-donor cylinder fuel injection amount by injecting a same adjusted non-donor cylinder fuel injection amount to each of a plurality of non-donor cylinders of the engine.

18. The system of claim 10, wherein the controller is operable to adjust the donor cylinder fuel injection amount by differently adjusting a donor cylinder fuel injection amount to one or more donor cylinders of an engine relative to one or more other donor cylinders of the engine, and adjust the non-donor cylinder fuel injection amount by differently adjusting a non-donor cylinder fuel injection amount to one or more non-donor cylinders of the engine relative to one or more other non-donor cylinders of the engine.

19. The system of claim 10, wherein if the donor cylinder fuel injection amount increases, the controller is operable to adjust operation of the cooling fan to increase air flow provided to the EGR cooler.

20. The system of claim 10, wherein if the donor cylinder fuel injection amount increases, the controller is operable to adjust operation of the coolant pump to increase coolant flow through the EGR cooler.

* * * * *